US007693310B2

(12) United States Patent
Kato et al.

(10) Patent No.: US 7,693,310 B2
(45) Date of Patent: Apr. 6, 2010

(54) MOVING OBJECT RECOGNITION APPARATUS FOR TRACKING A MOVING OBJECT BASED ON PHOTOGRAPHED IMAGE

(75) Inventors: Noriji Kato, Kanagawa (JP); Masahiro Maeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 770 days.

(21) Appl. No.: 11/154,583

(22) Filed: Jun. 17, 2005

(65) Prior Publication Data

US 2006/0093185 A1 May 4, 2006

(30) Foreign Application Priority Data

Nov. 4, 2004 (JP) ............................. 2004-320240

(51) Int. Cl.
*G06K 9/00* (2006.01)
(52) U.S. Cl. .................... 382/118; 382/115; 382/103
(58) Field of Classification Search ................ 382/103, 382/115, 117, 118, 190
See application file for complete search history.

(56) References Cited

U.S. PATENT DOCUMENTS

| 6,111,517 | A | * | 8/2000 | Atick et al. ............... 340/5.83 |
| 6,148,092 | A | * | 11/2000 | Qian ........................... 382/118 |
| 6,542,621 | B1 | * | 4/2003 | Brill et al. ................... 382/103 |
| 7,149,325 | B2 | * | 12/2006 | Pavlidis et al. ............. 382/103 |
| 7,330,566 | B2 | * | 2/2008 | Cutler ........................ 382/103 |

FOREIGN PATENT DOCUMENTS

| JP | A 02-311962 | 12/1990 |
| JP | A 10-049718 | 2/1998 |
| JP | A 2000-105819 | 4/2000 |
| JP | A 2002-269546 | 9/2002 |

OTHER PUBLICATIONS

H.A. Rowly et al.; Rotation Invariant Neural Network—Based Face Detection; Proceedings of IEEE Conference on Comp-44; (1996).
Laurens Wiskott et al.; Face Recognition by Elastic Bunch Graph Matching; Proc. 7th Intern. Conf. on Computer Analysis of Image and Patterns; (1997).
Matthew A. Turk et al.; Eigenfaces for Recognition Journal of Cognitive Neuroscience; vol. 3, No. 1, pp. 71-86 (1991).

* cited by examiner

*Primary Examiner*—Brian Q Le
*Assistant Examiner*—Edward Park
(74) *Attorney, Agent, or Firm*—Oliff & Berridge PLC

(57) ABSTRACT

A moving object recognition apparatus includes: a feature image extraction unit that extracts feature image portions for enabling the moving object to be determined from the moving image; a position detection unit that detects position information of the moving object in time series from the moving image, the position information based on which the feature image portion is extracted; a determination unit that determines identity of the feature image portions extracted from the moving object; and a track information retention unit that retains the time-series position information linked to the moving object having the feature image portion having the identity based on the determination.

8 Claims, 6 Drawing Sheets

FIG. 4

| ID | CURRENT PERSON COORDINATE | LINK TO FACE IMAGE | PERSON COORDINATE HISTORY |
|---|---|---|---|
| 1 | $(x_1, y_1)$ | Img01.bmp | $(t_0, x_1(t_0), y_1(t_0)), (t_1, x_1(t_1), y_1(t_1)), \cdots$ |
| 2 | $(x_2, y_2)$ | Img02.bmp | $(t_0, x_2(t_0), y_2(t_0)), (t_1, x_2(t_1), y_2(t_1)), \cdots$ |
| 3 | NOT FOUND | Img03.bmp | $(t_0, x_3(t_0), y_3(t_0)), (t_1, x_3(t_1), y_3(t_1)), \cdots$ |
| N | $(x_N, y_N)$ | Img04.bmp | $(t_0, x_N(t_0), y_N(t_0)), (t_1, x_N(t_1), y_N(t_1)), \cdots$ |

MOVING OBJECT RECOGNITION APPARATUS FOR TRACKING A MOVING OBJECT BASED ON PHOTOGRAPHED IMAGE

BACKGROUND OF THE INVENTION

1. Field of the Invention

This invention relates to a technique of recognizing a moving object such as a person or an automobile in a moving image and in particular to a technique capable of avoiding confusion between moving objects and precisely tracking and recognizing each moving object.

2. Description of the Related Technique

A moving image photographed by a camera is used in various applications such as tracking the motion of each customer in a store and managing efficient commodity product placement in addition to security management.

The usages of the moving image include not only a mode in which an image is simply monitored and recorded, but also a mode in which the moving object such as a person shown in the moving image is recognized and tracked for monitoring and recording the motion of the moving object. For example, a region in which some motion exists is detected and photographed by a video camera provided on a ceiling and the person shown in the photographed moving image is tracked.

For example, a technique of extracting and tracking persons from the image photographed by a plurality of cameras and counting the number of persons passing through a predetermined determination line so that the number of persons can be precisely measured without being affected by back-and-force and side-to-side person overlap is known. (Refer to JP-A-10-049718.)

For example, the following technique is known as a technique that can be used for tracking persons in a moving image:

A technique of detecting a skin color region in an image, thereby recognizing the required portion of the face of a person, etc., is known; the technique can be used to detect a person in an image and the face of each person. (Refer to JP-A-2000-105819.)

Processing of recognizing the object image of the face of a person, etc., can be performed by determining the similarity degree between the object image and a provided reference image. A technique is known wherein once a face is detected from a moving image frame, a face image subjected to parallel move or rotation move from the position of the face is generated and the similarity degree between the generated face image and a reference image is determined; the technique can be used to detect the face of the person in the image (further the person). (Refer to JP-A-2002-269546.)

Normalization processing of converting an object image geometrically under a predetermined condition is previously performed, whereby the number of the reference images for comparison can be lessened. As for the normalization processing, a technique of detecting the difference between the image to be processed and the image after subjected to normalization based on an illumination pattern and performing normalization processing using the detection result is known. One example of such conventional technique is disclosed in: "Rotation Invariant Neural Network-Based Face Detection, H. A. Rowly, S. Baluja, and T. Kanade Proceedings of IEEE Conference on Comp-44", which will be referred to as "Rotation Invariant Neural Network".

A technique of extracting feature points from a face image and making a comparison with a provided template based on the feature points to conduct personal authentication from the face image is known; the technique can be used to determine whether or not two face images are identical. One example of such conventional technique is disclosed in: "Laurens Wiskott, Jean-Marc Fellous, Norbert Krouger and Christoph von der Malsburg, Face Recognition by Elastic Bunch Matching Proc. 7th Intern. Conf. on Computer Analysis of Image and Patterns 1997", which will be referred to as "Face Recognition by Elastic Bunch Matching".

A technique of mapping pattern information representing a face into a predetermined space so as to increase the individual difference and making a comparison with a provided template in the space to conduct personal authentication from the face image is known; the technique can be used to determine whether or not two face images are identical. One example of such conventional technique is disclosed in: "Matthew A. Turk and Alex P. Pentland, Eigenfaces for Recognition Journal of Cognitive Neuroscience Vol. 3, No. 1, pp. 71-86 (1991)", which will be referred to as "Eigenfaces for Recognition".

A technique of identifying the individual using the individual difference of the three-dimensional shape of the face rather than conducting personal authentication based on the shapes and placement of the feature portions of the eyes, nose, mouth, etc., of the face is known; the technique can be used to determine whether or not two face images are identical. (Refer to JP-A-2-311962.)

SUMMARY OF THE INVENTION

To track the moving object of a person, etc., using a moving image photographed by a camera, for example, if a plurality of moving objects are shown in the moving image frame and come close to each other or pass each other, the detection regions overlap and thus it becomes impossible to determine which moving object the motion region in the image is involved in, namely, confusion between the moving objects occurs and it becomes impossible to track the identical moving object; this is a problem.

It is therefore one of objects of the invention to provide a moving object recognition technique that can track a moving object such as a person shown in a moving image with the identity of the moving object kept.

According to a first aspect of the invention, there is provided a moving object recognition apparatus for recognizing and tracking a moving object based on a moving image photographed by a camera, the moving object recognition apparatus including: a feature image extraction unit that extracts feature image portions for enabling the moving object to be determined from the moving image; a position detection unit that detects position information of the moving object in time series from the moving image, the position information based on which the feature image portion is extracted; a determination unit that determines identity of the feature image portions extracted from the moving object; and a track information retention unit that retains the time-series position information linked to the moving object having the feature image portion having the identity based on the determination.

According to a second aspect of the invention, there is provided a program product for causing a computer system to execute procedures for retaining a moving object photographed in a moving image and time-series position information of the moving object in association with each other, the procedures including: extracting feature image portions for enabling the moving object to be determined from the moving image; detecting position information of the moving object in time series from the moving image, the position information based on which the feature image portion is extracted; determining identity of the feature image portions extracted from the moving object; and retaining the time-series position information linked to the moving object having the feature image portion having the identity based on the determination.

According to a third aspect of the invention, there is provided a moving object recognition method for retaining a moving object photographed in a moving image and time-series position information of the moving object in association with each other, the method including: extracting feature image portions for enabling the moving object to be determined from the moving image; detecting position information of the moving object in time series from the moving image, the position information based on which the feature image portion is extracted; determining identity of the feature image portions extracted from the moving object; and retaining the time-series position information linked to the moving object having the feature image portion having the identity based on the determination.

BRIEF DESCRIPTION OF THE DRAWINGS

The above objects and advantages of the present invention will become more apparent by describing in detail of a preferred embodiment thereof with reference to the accompanying drawings, wherein:

FIG. 4 is a drawing to describe track information according to the embodiment;

DETAILED DESCRIPTION OF THE PREFERRED EMBODIMENT

The invention will be discussed specifically based on an embodiment of tracking a person shown in a moving image.

Figure 1:
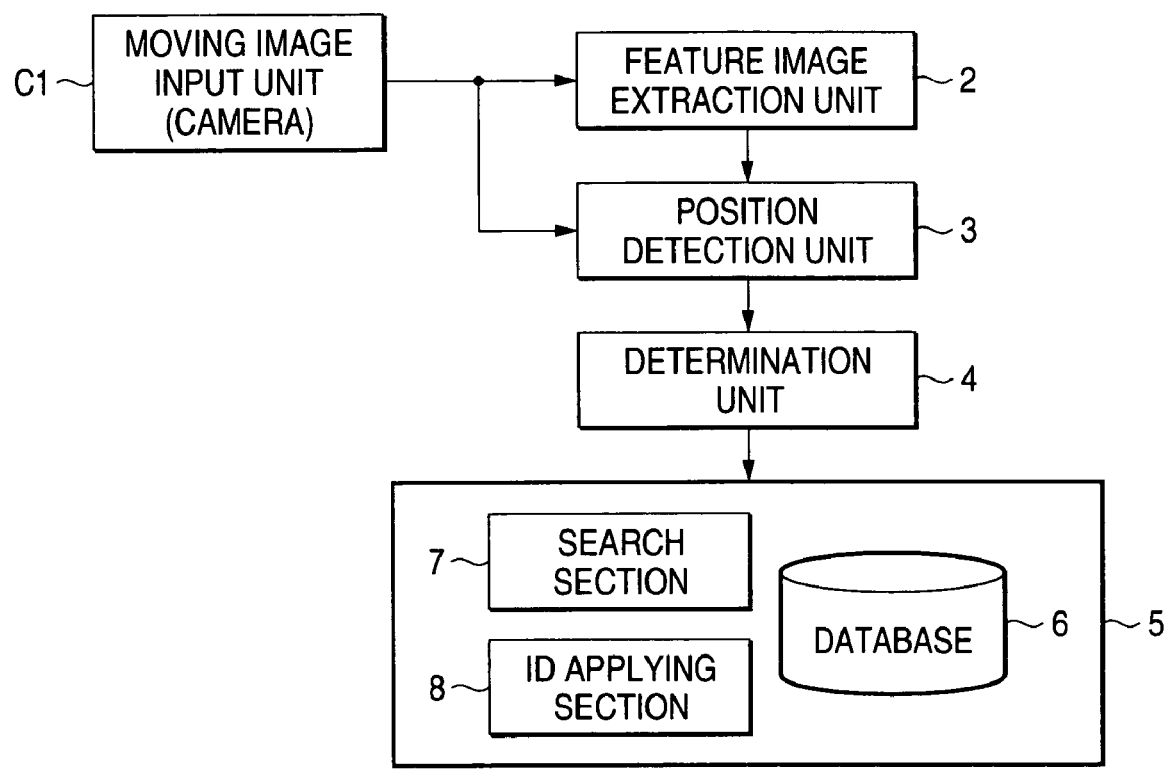
FIG. 1 is a block diagram to show the configuration of a moving object recognition apparatus according to an embodiment of the invention.

FIG. 1 shows an example of the configuration of a moving object recognition apparatus according to the invention. In the example, a moving image photographed by a video camera C is input to a moving object recognition apparatus 1 for processing, as shown in FIG. 2.

Figure 2:
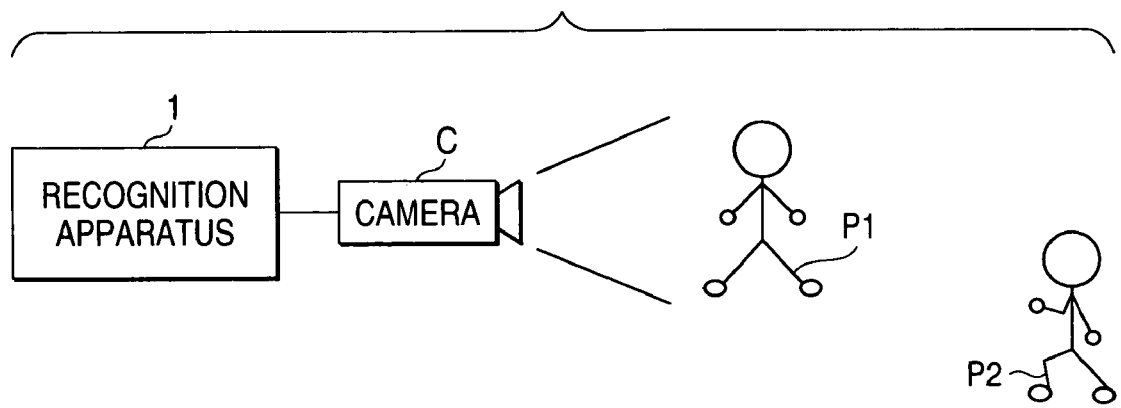
FIG. 2 is a drawing to describe a photographing state according to the embodiment.

FIG. 2 shows a state in which two persons P1 and P2 as moving objects exist in the photograph region.

The moving object recognition apparatus 1 includes a feature image extraction unit 2 for extracting the feature image portions for enabling the persons P1 and P2 to be determined from the moving image photographed by the video camera C (in the example, face image portions of the persons, T1 and T2), a position detection unit 3 for detecting position information of the persons P1 and P2 with the feature image portions T1 and T2 extracted by the feature image extraction unit 2 in time series from within the moving image photographed by the camera C, a determination unit 4 for determining the identity between moving image frames F about each of the feature image portions T1 and T2 extracted by the feature image extraction unit 2, and a track information retention unit for retaining information of the person having the feature image portions having the identity between the moving image frames F (in the example, person ID given to each person) based on the determination result of the determination unit 4 and the time-series position information detected in sequence by the position detection unit 3 in a database 6 in association with each other.

In the example, the moving image photographed by the camera C is processed in real time, but the moving image input unit C may be used as moving image memory for later performing processing of the moving images stored in the memory.

Figure 3:
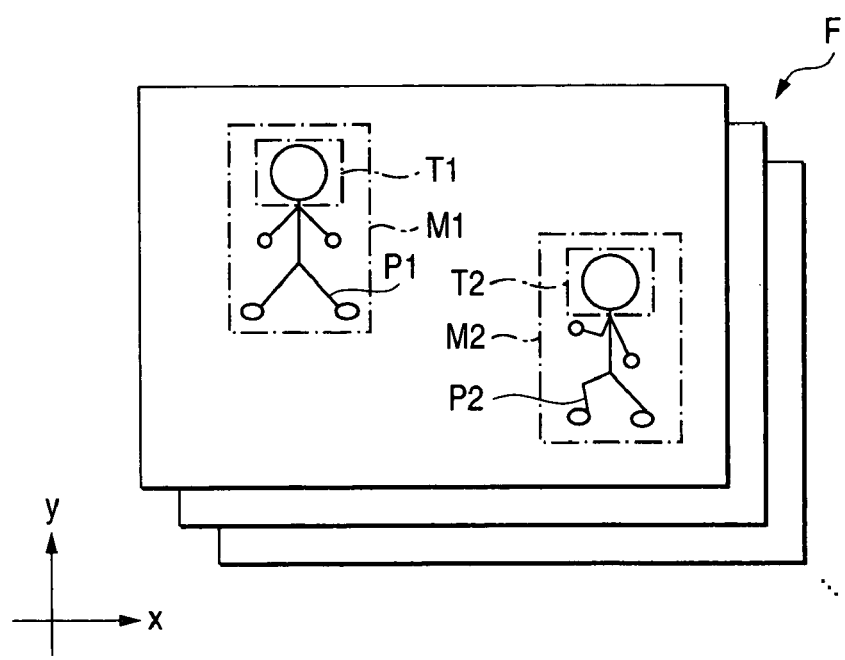
FIG. 3 is a drawing to describe moving image frames according to the embodiment.

The feature image extraction unit 2 performs processing of determining person image regions M1 and M2 linked to the persons P1 and P2 as moving objects from the moving image with a plurality of continuous image frames F in time series and processing of extracting the face image portions of the persons, T1 and T2, from the determined person image regions M1 and M2, as shown in FIG. 3.

The processing of determining the person image regions M1 and M2 can be carried out according to any of various known methods. For example, it is performed using a known optical flow calculation method of determining that a region wherein motion is large in the moving image frame F is the person image region M1, M2. The person image region M1, M2 is determined in the first frame F in the moving image and further likewise is determined in the second frame F continued from the first frame F. When the positions of the corresponding person image region M1, M2 determined between the frames F are close to each other within a predetermined distance, it is determined that the person image region M1, M2 is the image of the same person P1, P2. That is, processing of tracking each of the persons P1 and P2 shown in the moving image is performed, and the ID for identifying each person is given to each of the persons P1 and P2 for identification management, as described later.

As the method of determining the person image region from the moving image frame, the method of determining the person region by face detection described in JP-A-2002-269546 or in the document "Rotation Invariant Neural Network" or the method of determining the person region by detecting skin color information representing the face features described in JP-A-2000-105819 may also be used.

The processing of extracting the face image portions T1 and T2 described above can be carried out according to any of various known methods. For example, it is performed using the face detection method described in JP-A-2002-269546 or in the document "Rotation Invariant Neural Network". A comparison is made between the luminance pattern of pixels in an image region and a provided face pattern reference set and when the luminance pattern belongs to the reference set, the image region is extracted as the face image portion T1, T2. That is, each of the face image portions of the persons P1 and P2 determined from within the moving image is extracted, and the face image portions T1 and T2 are managed in association with the persons P1 and P2 from whom the face image portions T1 and T2 are extracted, as described later.

The position detection unit 3 detects the position information of each of the persons P1 and P2 (person image region or face image portion) determined in the frame for each frame F as shown in FIG. 3, and outputs the detected position information in sequence in time series.

The position information detection processing can be carried out according to any of various known methods. For example, position information can be detected based on the position or the size of the person image region M1, M2 or the face image portion T1, T2 within the frame F. In the example wherein the moving image from one camera is processed, the position in the frame F is detected according to (x, y) coordinates, as shown in FIG. 3.

The feature image extraction unit 2 extracts the face image portions T1 and T2 in sequence as described above. The determination unit 4 determines whether or not the processed face image portion has the identity with the face image portion already processed and recorded in the database 6. That is, the identity of the face image portions between the frames F is determined, whereby it is guaranteed that if the identity exists, the same person is tracked by performing the processing described above and the time-series position information can be detected.

The processing of determining whether or not the face images are identical can be carried out according to any of various known methods. For example, the method described in JP-A-2-311962 or in the documents "Face Recognition" and "Eigenfaces for Recognition" can be used to determine whether or not the two face images compared by feature comparison of face elements making up a face have identity.

The track information retention unit 5 has a search section 7 for searching the database 6 for the corresponding information based on the person ID and ID applying section 8, if the corresponding information is not found in the database 6 (namely, a new face image portion is extracted), for applying a new person ID for recording the new face image portion and the position information detected linked to the face image portion in association with each other.

Initially, a new person ID is applied by the ID applying section 8 and the face image portion and the position information are recorded in the database 6 in association with the person ID.

That is, if the determination unit 4 determines that the processed face image portion is identical with the face image portion already processed, the search section 7 searches the database 6 for the record information with which the already processed face image portion is associated, and records the position information detected linked to the processed face image in the found information. On the other hand, if the determination unit 4 does not determine that the processed face image portion is identical with the face image portion already processed, the ID applying section 8 gives a new person ID and records the position information detected linked to the processed face image in the database 6 in association with the person ID.

The database 6 records track information containing information of the current person coordinates, link to face image portion, person coordinate history, etc., in association with the ID given to each person, as shown in FIG. 4, and the track information is updated sequentially with the processing as described above.

For example, the person identified by ID "1" is recorded as the current position in the moving image is (x1, y2), the link information to the face image portion is "Img01.bmp," and the position information history of the move history is (t0, x1 (t0), y1 (t0))), (t1, x1 (t1), y1 (t1)) . . . with time information (t) recorded in the database 6 added to each position information piece; the time-series position information for each person is recorded.

The moving object recognition apparatus 1 may be provided with a unit for outputting the track information in the database 6; for example, the move path of each person may be displayed on a screen based on the track information.

The feature image extraction unit 2, the position detection unit 3, the determination unit 4, and the track information retention unit 5 described above can be each a dedicated hardware component; in the example, however, they are provided as a program according to the invention is executed in a computer implementing the moving object recognition apparatus 1.

An integration unit 9 described later not only can be a dedicated hardware component, but also can be provided as the program according to the invention is executed in a computer.

Figure 5:
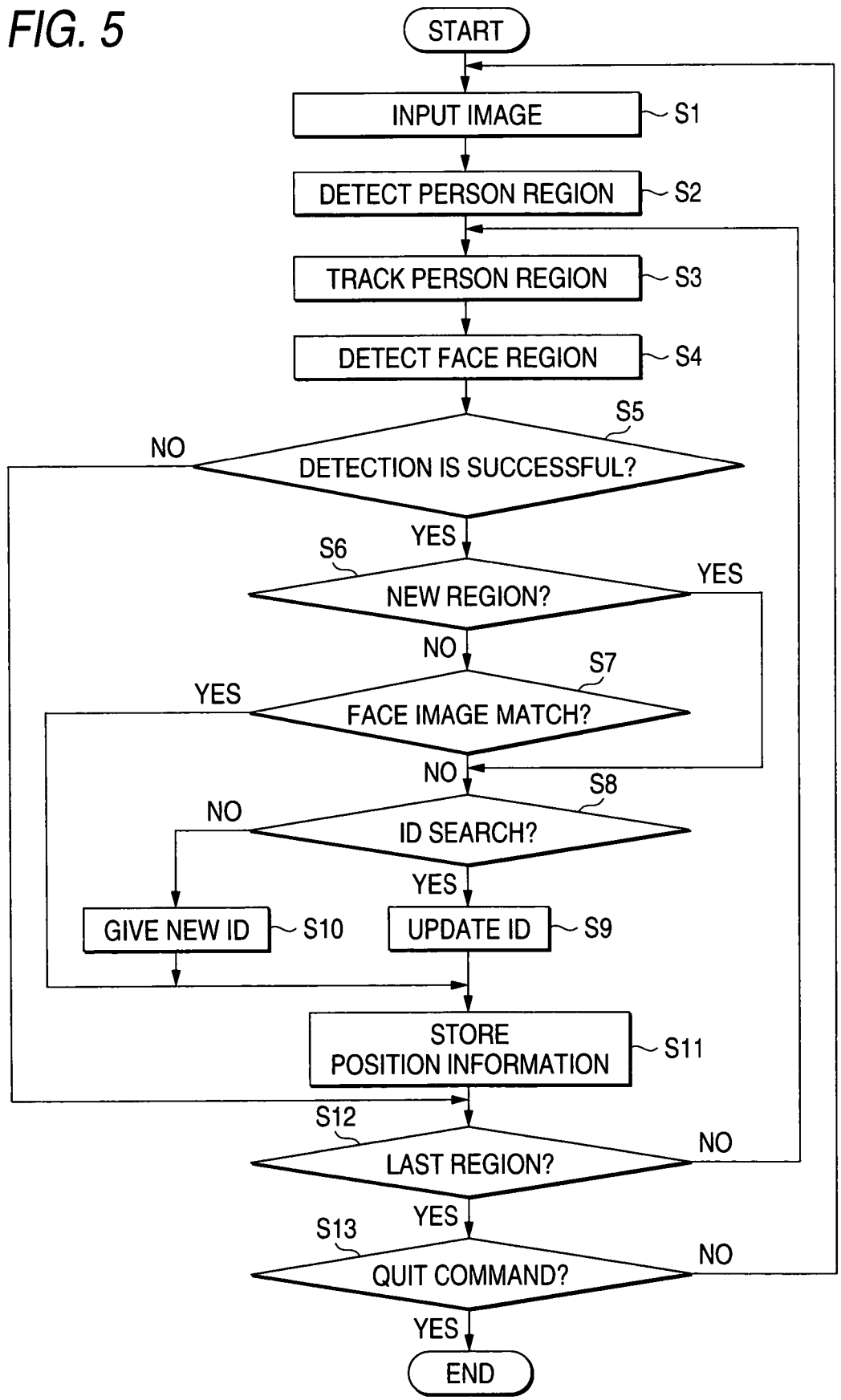
FIG. 5 is a flowchart to describe a processing procedure of the moving object recognition apparatus according to the embodiment.

FIG. 5 shows the processing procedure of the moving object recognition apparatus 1 described above. The processing executed by the moving object recognition apparatus 1 will be discussed in detail with reference to FIG. 5.

In the example, the moving image input from the camera C is processed one frame at a time in order. When a moving image frame F is input from the camera C (step S1), the feature image extraction unit 2 determines all person image regions M1 and M2 from the frame F (step S2). The position detection unit 3 detects position information of each of the determined person image regions M1 and M2.

Processing at steps S3 to S12 is repeated for each of the determined person image regions M1 and M2.

The feature image extraction unit 2 first tracks the person image region M1 (step S3) and extracts its face image portion T1 (step S4). If the detection of the face image portion T1 is successful (YES at step S5), the feature image extraction unit 2 determines whether or not the face image portion T1 is new (step S6).

In the determination processing, whether or not the person image region M1 and the person image region determined in the preceding frame F in the moving image are within a predetermined distance in the frame (namely, are close to each other) is determined. If they are distant from each other, continuity between the frames does not exist and therefore the person image region M1 is determined a new person image shown newly (or again) in the moving image frame. That is, whether or not the person is identical or new (or again appearing) is determined based on whether or not the image of one person has continuity between the frames, and the identical person is tracked.

If the person image region M1 is not determined new, the search section 7 acquires the face image portion from the database 6 based on the person ID and link information given to the person image region determined in the preceding frame F, and the determination unit 4 makes a comparison between the face image portion in the preceding frame and the face image portion T1 extracted from the person image region M1 for determining the identity (step S7).

If the identity is found as the result of the determination, the detected position information is recorded in the entry of the database 6 identified by the person ID (step S11).

If the identity is not found as the result of the determination or if the face image portion T1 is determined new at step S6, the search section 7 searches the database 6 for the entry (person ID) recording the face image portion having the identity with the face image portion T1 (step S8). If the entry is found, the search section 7 adopts the person ID in the entry as the ID of the person image region M1 (step S9) and records the position information detected about the person image region M1 in the entry (step S11).

On the other hand, if the person ID in the entry is not found, the ID applying section 8 gives a new person ID (step S10) and records the detected position information in a new entry identified by the person ID in the database 6 together with the link information to the face image portion T1 (step S11).

The processing sequence (steps S3 to S11) is performed for the next person image region M2 determined from the frame F (step S12). The processing sequence (steps S1 to S12) is performed in sequence for each frame in the moving image and the position information for each person (person ID) is stored in the database 6 as time-series information involving the time information. When the user enters a quit command, the processing operation is terminated (step S13).

If a plurality of persons shown in a frame move and a cross state in which the image regions of the persons overlap in the frame occurs, there is a possibility that confusion between the persons may occur; however, as the determination processing as described above is performed, the position information history of the person can be recorded in the database 6 with the identity of the person kept without causing confusion.

As the determination processing as described above is performed, if the person once exiting from the frame is again shown in the frame, the position information history of the person can be recorded in the database 6 with the identity of the person kept.

As the determination processing as described above is performed, if a new person is shown in the frame, track information of the person can be recorded additionally.

The moving object recognition apparatus 1 may be configured to perform that the object is a moving object other than the person or that the identity is determined based on dress, a sign, etc., in addition to the face.

Figure 6:
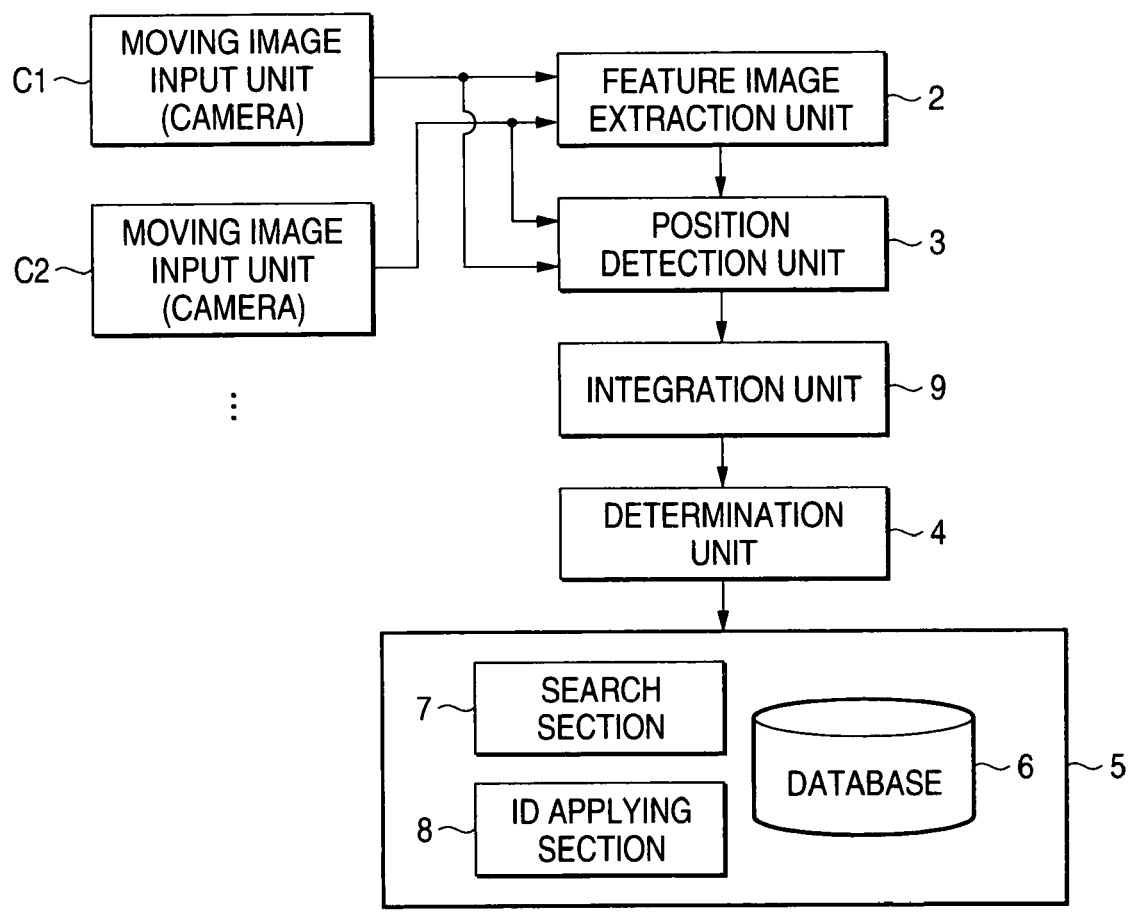
FIG. 6 is a block diagram to show the configuration of a moving object recognition apparatus according to another embodiment.
Figure 7:
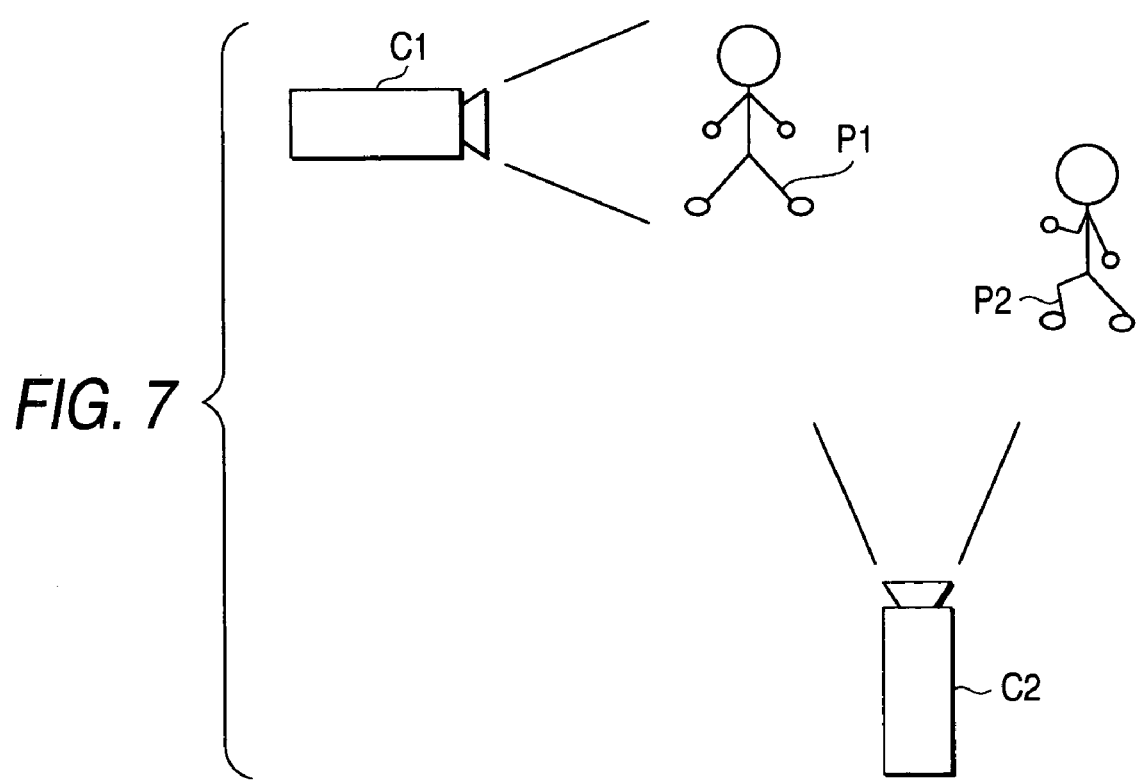
FIG. 7 is a drawing to describe a photographing state according to the embodiment shown in FIG. 6.

The moving object recognition apparatus 1 may be configured so that an overlap photograph region may be photographed by a plurality of cameras C1, C2, . . . placed at varied photographing angles and the provided moving images may be processed, for example, as shown in FIGS. 6 and 7.

To thus process a plurality of moving images, feature image extraction unit 2 may extract a person image region and a face image portion (feature image portion) for enabling a moving object to be determined from a plurality of moving images, position detection unit 3 may detect position information of the person in the coordinate system of each moving image, and integration unit 9 may convert the detected position information in the coordinate systems into the same coordinate system for integration.

A plurality of moving images are thus used, whereby the identity of the moving objects can be determined from the images photographed from multiple directions and the moving object track accuracy can be enhanced and further the time-series position information of each moving object can also be recorded as three-dimensional position information.

As described above, according to the embodiments, for the moving object with the identity kept based on the feature image portion, the information indicating the position to which the moving object moves (position information) is recorded in time series and if a plurality of moving images are shown in the moving image, track information of identifying each moving object can be provided.

The feature image extraction unit tracks an image portion where motion exists between frames as a moving object image portion from a moving image and extracts the feature image portion from the moving object image portion.

The moving object to be recognized is a person and the feature image portion is the image portion of the face of the person.

The moving object to be recognized is a person and the feature image portion is a skin color image portion in the moving image.

The moving object to be recognized may typically be a person, however, various moving substances such as an automobile, a robot, and a transported commodity may also be the moving objects to be recognized.

To adopt a person as the moving object to be tracked, for example, the image portion of the portion representing the body features proper to the person such as partial image portions of the face image portion of the person, the eyes, nose, mouth, etc., of the person may be used as the feature image portion. Further, in the invention, for example, in a closed environment to some extent, the image portion representing the hair style of the person or the dress color or shape can also be used as the feature image portion, and the image portion representing a label such as a bar code attached to the person can also be used as the feature image portion.

To adopt an automobile as the moving object to be recognized, the number plate can also be used as the feature image portion, and to adopt a commodity as the moving object to be tracked, the image portion representing a label attached to the commodity can be used as the feature image portion.

In the embodiment, the track information retention unit retains the time-series position information in association with an identifier capable of determining the moving object (for example, moving object ID) and search section searches already retained information for the moving object identifier with which the detected time-series position information is associated, and the position information of the feature image portions having identity is associated with the same moving object identifier.

Therefore, the position information relating to the same moving object is recorded in the same moving object identifier in time series; for example, if the moving object moving from the photographing region to the outside returns to the photographing region and again appears in the moving image, the track information of the moving object is recorded consistently.

In the moving object recognition apparatus according to the embodiment, if the feature image portion does not have identity and is new, identifier applying section gives a new moving object identifier with which the detected time-series position information is associated.

In the embodiment, the track information retention unit manages the feature image portion extracted from the moving image in association with the moving object from which the feature image portion is extracted (for example, moving object ID). In this management method, the real data of the feature image portion may be recorded together with the moving object identifier and the time-series position information or may be recorded in memory different from the moving object identifier and the time-series position information and the real data of the feature image portion and the moving object identifier and the time-series position information may be linked with each other so that the real data of the feature image portion can be acquired at any time.

The moving object recognition apparatus according to the embodiment may not only process the moving image photographed by one camera, but also process a plurality of moving images photographed by a plurality of cameras placed with the photograph regions overlapped, in which case the feature image extraction unit extracts a feature image portion for enabling a moving object to be determined from a plurality of moving images, and integration unit integrates the position information of the feature image portions detected by the position detection unit in the same coordinate system.

Accordingly, the identity of the moving objects can be determined from the feature image portions photographed from multiple directions, so that the moving object track accuracy can be enhanced and further the time-series position information of each moving object can also be recorded as three-dimensional position information.

According to the embodiment, to record the position information of the moving object detected from the moving image, the position information relating to the same moving object is recorded in association with the same moving object based on the identity determination of the feature image portions of the moving objects, so that the time-series position information is recorded with the identity of the moving object and the moving object can be tracked with the identity thereof kept.

The present invention is typically carried out as a moving object recognition apparatus for recognizing and tracking a moving object based on a moving image photographed by a camera, but is also carried out as a computer program for implementing a moving object recognition apparatus as a computer and a moving object recognition method executed by a moving object recognition apparatus.

Although the present invention has been shown and described with reference to the embodiment, various changes and modifications will be apparent to those skilled in the technique from the teachings herein. Such changes and modifications as are obvious are deemed to come within the spirit, scope and contemplation of the invention as defined in the appended claims.

FIG. 1
2 FEATURE IMAGE EXTRACTION UNIT
3 POSITION DETECTION UNIT
4 DETERMINATION UNIT
5 TRACK INFORMATION RETENTION UNIT
6 DATABASE
7 SEARCH SECTION
8 ID APPLYING SECTION
C MOVING IMAGE INPUT UNIT (CAMERA)

FIG. 2
1 RECOGNITION APPARATUS
C CAMERA

FIG. 4
ID CURRENT PERSON COORDINATES LINK TO FACE IMAGE PERSON COORDINATE HISTORY

FIG. 5
START
S1 INPUT IMAGE
S2 DETECT PERSON REGION
S3 TRACK PERSON REGION
S4 DETECT FACE REGION
S5 IS DETECTION SUCCESSFUL?
S6 NEW REGION?
S7 FACE IMAGE MATCH?
S8 ID SEARCH?
S9 UPDATE ID
S10 GIVE NEW ID
S11 STORE POSITION INFORMATION
S12 LAST REGION?
S13 QUIT COMMAND?
END

FIG. 6
2 FEATURE IMAGE EXTRACTION UNIT
3 POSITION DETECTION UNIT
4 DETERMINATION UNIT
5 TRACK INFORMATION RETENTION UNIT
6 DATABASE
7 SEARCH SECTION
8 ID APPLYING SECTION
9 INTEGRATION UNIT
C1 MOVING IMAGE INPUT UNIT (CAMERA)
C2 MOVING IMAGE INPUT UNIT (CAMERA)

FIG. 7
C1 CAMERA
C2 CAMERA

What is claimed is:

1. A moving object recognition apparatus for recognizing and tracking a person based on moving images photographed by a camera, a first frame of the moving images being a preceding frame of a second frame of the moving images, the moving object recognition apparatus comprising:
a feature image extraction unit that extracts facial feature image portions for enabling the person to be determined by face recognition from the moving images;
a position detection unit that detects position information of the person in time-series from the moving images, each time-series position information indicating a position of the person in a respective moving image;
a determination unit, using a processor, that makes a comparison between the facial feature image portion in the first frame and the facial feature image portion in the second frame, and determines correspondence therebetween, the facial feature image portion in the first frame being associated with an identity of the person;
a search section, using a processor, that, when the determination unit determines that the facial feature image portions in the first frame and the second frame do not have the correspondence therebetween, searches a database for finding another facial feature image portion stored in the database, said another facial feature image portion having correspondence with the facial feature image portion in the second frame; and
a track information retention unit, using a processor, that retains the time-series position information in the form of coordinate data in the moving images linked with an identifier that identifies the person having the facial feature image portions, which are determined to have the identity, wherein the identifier is a face image portion of the identified person associated with each time-series position information to retain a position information history associated with the identified person,
wherein the track information retention unit includes an identifier applying section and the search section, and
when the searching by the search section fails, the determination unit concludes that the extracted facial feature image portion in the second frame is for a new person, and the identifier applying section applies to the new person a new identifier with which the detected time-series position information is to be associated.

2. The moving object recognition apparatus as claimed in claim 1,
wherein the track information retention unit includes a search section that searches information retained in the track information retention unit for the identifier of the person with which the detected time-series position information is to be associated.

3. The moving object recognition apparatus as claimed in claim 1, wherein the track information retention unit manages the extracted facial feature image portions in association with the identifier of the person from which the facial feature image portions are extracted.

4. The moving object recognition apparatus as claimed in claim 1, wherein the feature image extraction unit tracks an image portion where motion exists between frames as a person image portion from the moving images and extracts the facial feature image portion from the person image portion.

5. The moving object recognition apparatus as claimed in claim 1,
wherein the feature image extraction unit extracts facial feature image portions for enabling the person to be determined from a plurality of moving images photographed by a plurality of cameras, and the moving object recognition apparatus includes an integration unit that integrates position information of the feature image portions detected by the position detection unit in the same coordinate system.

6. The moving object recognition apparatus as claimed in claim 1, wherein the facial feature image portions are image portions of a skin color in the moving image.

7. A computer-readable medium having recorded thereon a program for causing a computer system to execute procedures for retaining a person photographed in moving images, a first frame of the moving images being a preceding frame of a second frame of the moving images, and time-series position information of the person in association with each other, the procedures comprising:

extracting facial feature image portions for enabling the person to be determined from the moving images;

detecting position information of the person in time series from the moving images, each time-series position information indicating a position of the person to a respective moving image;

making a comparison between the facial feature image portion in the first frame and the facial feature image portion in the second frame and determining a correspondence therebetween, the facial feature image portion in the first frame being associated with an identity of the person;

searching a database for finding another facial feature image portion stored in the database, when the facial feature image portions in the first frame and the second frame do not have correspondence therebetween, said another facial feature image portion having correspondence with the facial feature image portion in the second frame; and retaining the time-series position information in the form of coordinate data in the moving images linked with an identifier that identifies the person having the facial feature image portions, which are determined to have the identity, wherein the identifier is a face image portion of the identified person associated with each time-series position information to retain a position information history associated with the identified person, wherein when the searching fails, determining that the extracted facial feature image portion in the second frame is for a new person, and a new identifier is applied to the new person with which the detected time-series position information is to be associated.

8. A computer-implemented moving object recognition method for retaining a person photographed in moving images, a first frame of the moving images being a preceding frame of a second frame of the moving images, and time-series position information of the person in association with each other, the method comprising:

extracting facial feature image portions for enabling the person to be determined from the moving images;

detecting, using a processor, position information of the person in time series from the moving images, each time-series position information indicating a position of the person in a respective moving image;

making a comparison, using the processor, between the facial feature image portion in the first frame and the facial feature image portion in the second frame and determining a correspondence therebetween, the facial feature image portion in the first frame being associated with an identity of the person;

searching a database, using the processor, for finding another facial feature image portion stored in the database, when the facial feature image portions in the first frame and the second frame do not have correspondence therebetween, said another facial feature image portion having correspondence with the facial feature image portion in the second frame;

retaining the time-series position information in a computer-readable storage medium in association with an identifier that identifies the person having the facial feature image portions, which are determined to have the identity, wherein the identifier is a face image portion of the identified person associated with each time-series position information to retain a position information history associated with the identified person, wherein when the searching fails, determining that the extracted facial feature image portion in the second frame is for a new person, and a new identifier is applied to the new person with which the detected time-series position information is to be associated.

* * * * *